United States Patent
Giacobbe et al.

(10) Patent No.: US 6,670,570 B2
(45) Date of Patent: Dec. 30, 2003

(54) METHODS AND APPARATUS FOR LOCALIZED HEATING OF METALLIC AND NON-METALLIC SURFACES

(75) Inventors: Frederick W. Giacobbe, Naperville, IL (US); Joseph E. Paganessi, Burr Ridge, IL (US); Yves Bourhis, Westmont, IL (US)

(73) Assignees: L'Air Liquide - Societe Anonyme a Directoire et Couseil de Surveillance pour l'Etude et l'Exploitation des procedes Georges Claude, Paris (FR); American Air Liquide, Inc., Fremont, CA (US)

( * ) Notice: Subject to any disclaimer, the term of this patent is extended or adjusted under 35 U.S.C. 154(b) by 13 days.

(21) Appl. No.: 10/097,667

(22) Filed: Mar. 14, 2002

(65) Prior Publication Data

US 2002/0190035 A1 Dec. 19, 2002

Related U.S. Application Data (60) Provisional application No. 60/298,774, filed on Jun. 15, 2001.

(51) Int. Cl.[7] ............................ B23K 26/00; B23K 15/00
(52) U.S. Cl. ................................ 219/121.12; 219/121.6
(58) Field of Search ...................... 219/121.12, 121.16, 219/121.17, 121.35, 121.6, 121.65, 121.66, 121.85

(56) References Cited

U.S. PATENT DOCUMENTS

| | | | |
|---|---|---|---|
| 5,676,866 A | * | 10/1997 | in den Baumen et al. |
| 5,767,483 A | * | 6/1998 | Cameron et al. |
| 6,087,612 A | * | 7/2000 | Robitschko et al. |
| 6,281,472 B1 | | 8/2001 | Faerber |
| 6,333,483 B1 | * | 12/2001 | Ueno |

* cited by examiner

Primary Examiner—Samuel M. Heinrich
(74) Attorney, Agent, or Firm—Linda K. Russell; Christopher J. Cronin (57) ABSTRACT

A method of treating an object containing a material of metal, oxidized metal, non-metal, and the like and combinations thereof. The method includes (a) exposing an object to a controlled gas atmosphere, and (b) during at least a portion of time during such exposing, subjecting a specific area of the material to an energy beam, preferably a focused energy beam, more preferably a focused and filtered energy beam, having sufficient intensity to provide for the treating of the specific area. Such treating includes heating, welding, cutting, dicing, soldering, singulating, reducing, oxidizing, fusing, melting, and the like and combinations thereof. The energy beam source can be a laser selected from a group which includes YAG lasers, excimer lasers, gas lasers, semiconductor lasers, solid-state lasers, dye lasers, X-ray lasers, free-electron lasers, ion lasers, gas mixture lasers, chemical lasers, and the like and combinations thereof. The method can further include contacting the material with a second material or several second materials. Such contacting can include welding, soldering, fusing, melting, joining, bonding, and the like and combinations thereof.

45 Claims, 1 Drawing Sheet

METHODS AND APPARATUS FOR LOCALIZED HEATING OF METALLIC AND NON-METALLIC SURFACES

RELATED APPLICATIONS

This application claims priority from provisional U.S. application Ser. No. 60/298,774 filed Jun. 15, 2001, incorporated herein by reference.

BACKGROUND OF THE INVENTION

The present invention relates generally to the field of treating objects containing materials and, more particularly, to the use of an energy beam from an energy beam source, such as a laser, to treat specific areas of such materials, such as specific areas of metal, oxidized metal, as well as non-metal such as optic components, glass, and plastic materials.

Lasers have been used for many purposes over the years. For example, lasers have been used for treating metal, such as metal cutting, metal welding, and the like. During such laser use, significant problems are encountered and need to be addressed. For example, undesirable reactions between the treating environment or atmosphere and the area to be treated must be limited, preferably prevented, without reducing the treating efficiency. Such undesirable reactions are due, in part, to the non-reduced or oxidized state of the materials to be treated and related metal oxide contamination. Thus, new and improved processes for using an energy beam from an energy beam source, such as a laser, or other device, to treat, and preferably reduce or join specific areas of materials contained on or in various objects, such as specific areas of metal and oxidized metal, which help limit, and preferably prevent, undesirable reactions between the treating environment and the specific areas to be treated without limiting the treating efficiency would be of significant contribution to the art and to the economy. In addition, new and improved processes for using an energy beam from an energy beam source, such as a laser, or other device, to treat specific areas of materials contained on or in various objects, such as specific areas of non-metal including ceramics and optic components, which help limit, and preferably prevent, undesirable reactions between the treating environment and the specific areas to be treated without limiting the treating efficiency would also be of significant contribution to the art and to the economy.

SUMMARY OF THE INVENTION

In accordance with the present invention, methods and apparatus are disclosed for treating specific areas of metal, oxidized metal, non-metal, and the like and combinations thereof contained on or in various objects with an energy beam, preferably a focused energy beam, more preferably a focused and filtered energy beam, from an energy beam source, such as a laser or electron beam generator, preferably in the presence of a controlled gas atmosphere.

One aspect of the present invention is a method of treating specific areas of an object, the method comprising: (a) exposing an object to a controlled gas atmosphere, such object comprising a material selected from the group consisting of metal, oxidized metal, non-metal, dielectric material, powdered glass, glass precursors, and the like and combinations thereof, and (b) during at least a portion of time during the exposing, subjecting a specific area of the material to an energy beam, preferably a focused energy beam, more preferably a focused and filtered energy beam, having sufficient energy intensity to provide treating of the specific area. Examples of treating include, but are not limited to, heating, welding, cutting, dicing, soldering, singulating, reducing, oxidizing, fusing, melting, and the like and combinations thereof. Preferably, the energy beam source comprises a laser or an electron beam generator.

Another aspect of the present invention is a method of heating specific areas of an object, the method comprising: (a) exposing an object to a controlled gas atmosphere, such object comprising a material selected from the group consisting of metal, oxidized metal, non-metal, dielectric material, powdered glass, glass precursors, and the like and combinations thereof, and (b) during at least a portion of time during the exposing, subjecting a specific area of the material to an energy beam, preferably a focused energy beam, more preferably a focused and filtered energy beam, having sufficient intensity to provide heating of the specific area. The method can further comprise contacting the material with one or more second materials, which can be similar or dissimilar to the material. Examples of suitable contacting include, but are not limited to, welding, soldering, fusing, melting, joining, bonding, and the like and combinations thereof.

A method of the present invention can be used for directly welding one or more components and/or component leads to metallic surfaces within a controlled gas atmosphere such as a typical welding gas atmosphere. A preferred method of the present invention is direct welding of similar or dissimilar materials within a controlled gas atmosphere, preferably a reducing gas atmosphere.

Examples of suitable methods of the present invention include, but are not limited to, welding, soldering, fusing, melting, joining, bonding, and the like and combinations thereof of electronic components to circuit boards;

welding, soldering, fusing, melting, joining, bonding, and the like and combinations thereof of non-metallic conducting elements, such as non-metallic superconductors, to circuit boards;

welding, soldering, fusing, melting, joining, bonding, and the like and combinations thereof involving metallic or non-metallic conductor "pastes" that may also be used in soldering as well as in other applications;

metallic and non-metallic bonding applications involving optic component fabrication and bonding of such components to each other and bonding the finished components onto conventional and non-conventional circuit boards;

fabricating optical type pathways (or transparent "lines") onto or into substrates, coatings, circuit boards and the like, initially coated with opaque or translucent material(s);

and the like and combinations thereof.

Methods and apparatus of the present invention have potential applications in selectively reducing metal oxide contamination on metallic surfaces prior to, and/or during, welding, soldering, fusing, melting, joining, bonding, and the like and combinations thereof, in direct and selective soldering of devices to circuit boards or other substrate surfaces, and in direct welding of selected devices to circuit boards or other substrate surfaces. An advantage in the use of the methods and apparatus of the present invention is the ability to rapidly and selectively treat only portions of a large object instead of the entire object.

Another aspect of the present invention is an apparatus for treating specific areas of an object. The apparatus generally comprises an energy beam source that provides an energy beam, a means for focusing the energy beam, a means for filtering the energy beam, a means for supporting and moving the energy beam source, and a means for exposing the object, comprising a material, to a controlled gas atmosphere, and for subjecting a specific area of such material to the energy beam, preferably to the focused energy beam, and more preferably to the focused and filtered energy beam. The apparatus can further comprise a means for controlling the energy beam source, a means for controlling the object, and a means for moving the energy beam. The apparatus provides for either selectively applying a controlled gas atmosphere "locally" at the treated site location or "globally" applying a controlled gas atmosphere over the entire treated object during a process of the present invention. Preferably, the energy beam source comprises a laser or an electron beam generator.

DETAILED DESCRIPTION OF THE INVENTION

Figure 1:
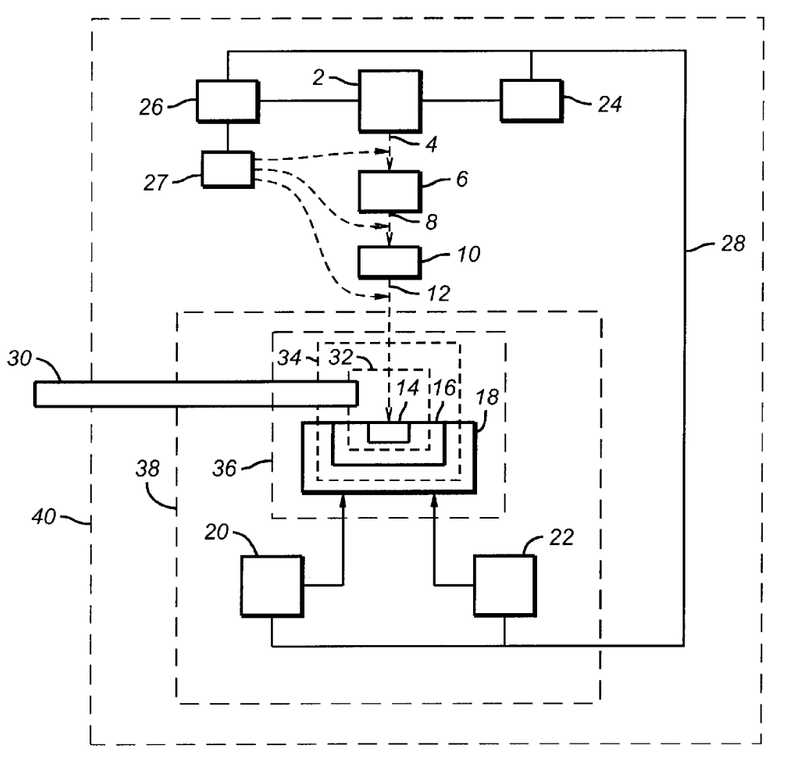
The FIGURE illustrates several embodiments of an apparatus that can be utilized to conduct a process of the present invention.

Novel processes have been discovered for using an energy beam, preferably a focused energy beam, more preferably a focused and filtered energy beam, from an energy beam source, such as a laser or electron beam generator, to treat specific areas of an object. A process of the present invention of treating specific areas of an object comprises: (a) exposing an object to a controlled gas atmosphere, such object comprising a material, and (b) during at least a portion of time during the exposing, subjecting a specific area of the material to an energy beam, preferably a focused energy beam, more preferably a focused and filtered energy beam, having sufficient intensity to provide treating of the specific area.

A controlled gas atmosphere of the present invention comprises a gas that can be flowing or non-flowing. The purity of a gas of the present invention can be any purity which provides for a process of the present invention. The purity of a gas of the present invention is generally at least about 50 percent, preferably at least about 60 percent, and more preferably at least about 70 percent. A controlled gas atmosphere of the present invention can comprise additional components such as inert gases and "promoters" such as water vapor as long as such additional components do not interfere with conducting a process of the present invention. A preferred controlled gas atmosphere of the present invention comprises a reducing gas atmosphere comprising a gas selected from the group consisting of hydrogen, ammonia, carbon monoxide, methane, and the like and combinations thereof. A preferred reducing gas atmosphere is one typically employed in traditional welding applications that may require the use of a reducing gas atmosphere.

Examples of "controlled gas atmospheres" include, but are not limited to, neutral gas atmospheres, oxidizing gas atmospheres, reducing gas atmospheres, carburizing gas atmospheres, and the like and combinations thereof.

Additional controlled gas atmospheres, that may be neutral or oxidizing in nature, may also be used in conducting a process of the present invention. Examples of additional controlled gas atmospheres include, but are not limited to, 100% carbon dioxide, a mixture comprising about 75% argon and about 25% carbon dioxide (such as those typically employed in the welding of mild steel), a mixture comprising about 90% helium, about 7.5% argon, and about 2.5% pure argon (such as those typically employed in aluminum welding), and the like. It should be understood that such examples of additional controlled gas atmospheres are only examples of possible non-reducing gas mixtures and are not meant to exclude the use of other conventional or non-conventional gases or gas mixtures that might be applicable in executing the techniques disclosed in this description of the invention. Suitable welding gas mixtures are available from Air Liquide America Corp. such as a mixture under the trade designation "ARCAL".

Examples of suitable "treating" include, but are not limited to, heating, welding, cutting, dicing, soldering, singulating, reducing, oxidizing, fusing, melting, and the like and combinations thereof.

The term "object" refers to any object(s), which can be treated with an energy beam, preferably a focused energy beam, more preferably a focused and filtered energy beam, from an energy beam source, preferably a laser, according to a process of the present invention. Examples of a suitable object include, but are not limited to, circuit boards, silicon-based wafers, integrated circuits, and the like and combinations thereof.

The term "material" refers to any material(s) contained on or in an object as described herein which can be treated with an energy beam, preferably a focused energy beam, more preferably a focused and filtered energy beam, from an energy beam source, preferably a laser, according to a process of the present invention. Examples of a suitable "material" include, but are not limited to, metal, oxidized metal, non-metal, and the like and combinations thereof.

In one embodiment of the present invention, treating comprises heating and the process further comprises contacting the material, preferably the thus-heated material, with one or more second materials. Examples of suitable "contacting" include, but are not limited to, welding, soldering, fusing, melting, joining, bonding, and the like and combinations thereof.

The term "second material" refers to any material(s), which can be contacted with a material as described herein according to a process of the present invention. The second material can be similar or dissimilar to the material. Examples of a suitable "second material" include, but are not limited to, metal, oxidized metal, non-metal, and the like and combinations thereof. According to a process(es) of the present invention, there can be one "second material" or more than one, i.e., several, "second materials".

The "exposing" of the present invention is conducted under an exposing condition comprising a temperature, gas or gas mixture pressure, and time period effective in providing for the "treating" of specific areas of the material during and/or after such specific areas are subjected to an energy beam as described herein. The exposing condition will generally depend on all of these factors.

Generally, the temperature is any temperature, which provides for a process of the present invention and is generally at least about 15° C., preferably at least about 20° C., and more preferably at least about 25° C. Generally, the exposing temperature is no more than about 4000° C., preferably no more than about 3750° C., and more preferably no more than about 3500° C. Generally, the exposing pressure is any pressure that provides for a process of the present invention. Preferably, the exposing pressure is at least about atmospheric (i.e., about 14.7 pounds per square inch absolute) and no more than about 3000 pounds per square inch absolute (psia). The exposing time is any time period which provides for a process of the present invention.

Generally, the time period ranges from about 0.0001 second, preferably from about 0.001 minute, up to about 20 hours, preferably up to about 15 hours, and more preferably up to about 10 hours.

According to a process of the present invention, during at least a portion of time during the exposing, a specific area of the material contained on or in an object as described herein is subjected to an energy beam, preferably a focused energy beam, more preferably a focused and filtered energy beam, from an energy beam source having sufficient intensity to provide for treating of the specific area as described herein. An important feature of the present invention is that during the "subjecting" of the present invention, the exposing condition does not significantly change. In other words, the temperature, pressure, and time period do not significantly change during the subjecting of the specific area(s) of the material to an energy beam as described herein. While not intending to be bound by theory, it is believed that the use of an energy beam and a controlled gas atmosphere as described herein, provides for a very specific and localized treating of a specific area of the material contained on or in an object as described herein without significantly affecting the surrounding material. It is also believed that the use of an energy beam and a controlled gas atmosphere as described herein provides for a very specific and localized treating of the specific area of the material subjected to the energy beam without significantly affecting the surrounding material and the object which helps limit any contamination and helps to minimize detrimental side effects. Generally, the treating and gas related effects can occur in any order and can even occur simultaneously. Preferably, the specific area of the material subjected to the energy beam is treated and modified in other ways almost simultaneously.

The phrase "during at least a portion of time during the exposing" refers to any time period which can provide for the treating, and preferential modifications, of a specific area of an object as described herein according to a process of the present invention. Generally, such time period is at least about the pulse time of the energy beam source, preferably a laser, used for the subjecting, preferably at least about $10^{-13}$ seconds, more preferably at least about $10^{-6}$ seconds. Generally, such time period is no more than about 1 hour, preferably no more than about 10 minutes, and more preferably no more than about 5 minutes.

According to a preferred process of the present invention, treating comprises heating, contacting comprises welding, fusing, melting, joining, bonding, and the like and combinations thereof, the object preferably comprises a circuit board, the material preferably comprises a metal on the surface of the circuit board onto which the second material which preferably comprises a non-metal, preferably a non-metallic conducting element, is placed, preferably welded, fused, melted, joined, bonded, and the like and combinations thereof. The term "non-metallic conducting element" refers to any element and the like that is non-metal and capable of conducting electric current. Examples of suitable non-metallic conducting elements include, but are not limited to, non-metallic superconductors, nonmetallic semiconductors, and the like and combinations thereof.

According to another preferred process of the present invention, treating preferably comprises heating, contacting preferably comprises welding, fusing, melting, joining, bonding, and the like and combinations thereof, the object preferably comprises a circuit board, the material preferably comprises a non-metal on the surface of the circuit board onto which the second material which preferably comprises a non-metal, preferably a non-metallic conducting element as described herein, is placed, preferably welded, fused, melted, joined, bonded, and the like and combinations thereof.

According to another preferred process of the present invention, treating preferably comprises heating, contacting preferably comprises soldering, the object preferably comprises a circuit board, the material preferably comprises a metal on the surface of the circuit board onto which the second material which is non-metal, preferably a non-metallic conducting element as described herein, is placed, preferably soldered. The other second material preferably comprises a non-metal, preferably a non-metallic conductor paste. The term "non-metallic conductor paste" (sometimes referred to as a "conductive adhesive") refers to any non-metal substance known in the art capable of being used as a paste or solder for non-metallic conducting elements. This preferred embodiment of a process of the present invention allows the non-metallic conducting element to be soldered to the metal on the surface of the circuit board by using the non-metallic conductor paste.

According to another preferred process of the present invention, the contacting comprises bonding, the material comprises a metal, and the second material comprises a non-metal. Preferably, the material and second material are optic components. The term "optic components" refers to any metal or non-metal components capable of transmitting light. Examples of suitable optic components include, but are not limited to glass lens, plastic lens, gratings, flat mirrors, parabolic mirrors, and the like and combinations thereof. When treating, preferably heating, more preferably melting, certain opaque or translucent materials, such materials will, upon cooling, re-solidify into clear or transparent lines or paths that will selectively transmit light. The untreated or unheated or unmelted portions of such opaque or translucent materials will remain opaque or translucent and will not be able to transmit light along specific lines or paths. Thus, another example process of the present invention comprises: (a) exposing an object to a controlled gas atmosphere, such object comprising an opaque or translucent material, and (b) during at least a portion of time during the exposing, subjecting a specific area of the opaque or translucent material to an energy beam, preferably a focused energy beam, more preferably a focused and filtered energy beam, having sufficient intensity to provide a treating, preferably a heating, more preferably a melting, of the specific area. Upon cooling, the treated area(s) will re-solidify into clear or transparent lines or paths that will selectively transmit light. The untreated or unheated or unmelted portions of such opaque or translucent material will remain opaque or translucent and will not be able to transmit light along specific lines or paths. Thus, by selectively treating a specific area(s) according to a process of the present invention, a "circuit board" can be produced which contains "circuits" of treated areas that will selectively transmit light.

Processes of the present invention can be conducted one or more times in series or in parallel and simultaneously or alternatively. For example, the exposing and subjecting can be conducted followed by an additional exposing to a second controlled gas atmosphere and subjecting to a second energy beam, preferably a second focused energy beam, more preferably a second filtered and focused energy beam, and so on until the desired level of treating is accomplished. The second and additional controlled gas atmosphere(s) can be the same as, or different from, the initial controlled gas atmosphere. Also, the second and additional energy beam(s) can be the same as, or different from, the initial energy beam.

An energy beam source of the present invention can be any energy beam source(s) that provides an energy beam(s) that can be used to treat a specific area of a material according to a process of the present invention. An energy beam source of the present invention generally comprises power and focus capabilities useful for conducting a process of the present invention. An energy beam source of the present invention generally comprises a laser or an electron beam generator, preferably a laser. Any type of laser can be used as long as the properties of such laser, such as wavelength, output power, duration of emission (pulsed or continuous), beam divergence and size, coherence, efficiency, and power requirements can be managed to provide for a process of the present invention. An energy beam source of the present invention preferably comprises a laser selected from the group consisting of YAG lasers, excimer lasers, gas lasers, semiconductor lasers, solid-state lasers, dye lasers, X-ray lasers, free-electron lasers, ion lasers, gas mixture lasers, chemical lasers, and the like and combinations thereof. A preferred laser is a YAG laser.

Examples of lasers and their respective wavelengths that can be used in the practice of the present invention include, but are not limited to, the type of lasers disclosed on page 11 of "Understanding Lasers," J. Hecht, Howard W. Sams & Company, publisher, 1988. Additional information regarding excimer lasers and their use can be found in U.S. Pat. No. 5,162,239, incorporated herein by reference.

Examples of lasers and their respective wavelengths that can be used in the practice of the present invention include, but are not limited to, excimer lasers such as krypton-fluoride (249 nm) and xenon-chloride (308 nm) excimer lasers. Additional examples of lasers and their respective wavelengths that can be used in the practice of the present invention include, but are not limited to, gas and gas mixture lasers such as nitrogen gas (337 nm) and helium-neon (543, 632.8, and 1150 nm) lasers. Chemical lasers such as hydrogen-fluoride chemical (2600–3000 nm) lasers can also be used in the practice of the present invention. Carbon dioxide (9000–11000 nm) lasers and ruby (694 nm) lasers can also be used in the practice of the present invention. Dye lasers such as organic dye (300–1000 nm) lasers can also be used in the practice of the present invention. Additional examples of lasers and their respective wavelengths that can be used in the practice of the present invention include, but are not limited to, ion lasers such as krypton ion (335–800 nm) and argon ion (450–530 nm) lasers. Additional examples of lasers and their respective wavelengths that can be used in the practice of the present invention include semiconductor lasers such as those in the GaInP family (670–680 nm), the GaAlAs family (750–900 nm), and the InGaAsP family (1300–1600 nm). A preferred laser is a YAG laser such as the Neodymium YAG laser (1064 nm).

The beam divergence and size are important parameters of any laser used in the present invention because localized treating is desired. The size of the laser beam's spot (and thus the specific area treated, preferably heated) will depend on the distance of such specific area from the laser source and the laser divergence angle. The radius of the beam=distance×sin (beam divergence) where beam divergence is measured in milliradians. A radian equals 57.3 degrees. Radians are typically used because the sine of a small angle in radians is almost equal to the angle itself expressed in radians. As an example, if the divergence angle is 2 milliradians and the beam travels 10 meters, the radius of the beam is 20 mm and the diameter of the beam is 40 mm. Generally, a laser beam radius of a laser used in the practice of a process of the present invention may be very small, preferably less than 1.0 mm. Generally, a laser beam radius of a laser used in the practice of a process of the present invention is no more than about 0.1 mm, preferably no more than about 0.001 mm. Such ranges of laser beam radius will fix the combination of distance (from laser beam source to specific area being treated, preferably heated) and beam divergence angle that is required for any particular treatment. Determining the proper combination of distance and beam divergence angle based on the disclosed ranges of laser beam radius is within the skill in the art.

An important feature of a process of the present invention is that only specific areas that are treated, preferably heated, will be affected by the presence of the controlled gas atmosphere of the present invention. The entire object, and preferably the rest of the material other than the specific area(s), does not need to be treated. Generally, the controlled gas atmosphere will be transparent to the energy beam so that most of the energy can be transmitted directly to the specific area(s) of the material to be treated.

Except for the losses due to reflection, which may become significant for specific areas already reduced or in an initial non-oxidized state, selected laser beam wavelengths can be optimized and focused to promote the most efficient energy transfer to the specific areas of the material comprising metal, oxidized metal, non-metal, and the like and combinations thereof. The energy beam, preferably laser beam, may also be "rastered" in two or three dimensions very rapidly, using a computerized control system, over specific areas of the material to enable very precise and localized treating. A significant feature of the present invention is that rapid, controlled, and localized (or selected) treatment of specific areas of material as described herein can be achieved within a controlled gas atmosphere utilizing a process of the present invention. It may be preferred to operate a process(es) of the present invention in a gas-tight enclosure or "tunnel" system, but the inventive methods disclosed herein can also be easily adapted to be part of an "in-line" process, continuous or batch.

An additional feature of a process of the present invention is that direct joining of individual metallic component leads to surface metallic pads, with or without the use of solder and/or fluxing agents, is possible if the energy beam, preferably focused energy beam, more preferably focused and filtered energy beam, is powerful enough. Such joining process can also be very rapid, computer controlled, and localized. The use of a tunnel with a controlled gas atmosphere may also be desirable in this case.

An apparatus for treating specific areas of an object according to a process of the present invention may comprise an energy beam source, such as a laser or electron beam generator, that provides an energy beam, a means for focusing the energy beam, a means for filtering the energy beam, a means for supporting and moving the energy beam source, and a means for exposing the object, comprising a material, to a controlled gas atmosphere, and for subjecting a specific area of the material to the energy beam, preferably to the focused energy beam, more preferably to the focused and filtered energy beam. An apparatus for treating specific areas of an object according to a process of the present invention can additionally comprise a means for controlling the energy beam source, a means for moving the energy beam, focused energy beam, filtered energy beam, and/or focused and filtered energy beam, and a means for controlling the object.

It should be understood that focusing the energy beam, filtering the energy beam, and moving the energy beam can be conducted in any suitable manner and in any suitable order. It should also be understood that focusing, filtering, and moving the energy beam may or may not be desired depending on the type of desired treatment.

Examples of suitable means for focusing the energy beam include, but are not limited to, glass lenses, quartz lenses, optical focusing devices, magnetic field lenses, electric field lenses, electron beam focusing devices, and the like and combinations thereof.

Examples of suitable means for filtering the energy beam include, but are not limited to, optical filters, and the like and combinations thereof.

Examples of suitable means for supporting and moving the energy beam source include, but are not limited to, conventional metallic mechanical structures, non-conventional metallic mechanical structures, conventional non-metallic mechanical structures, non-conventional non-metallic mechanical structures, and the like and combinations thereof. Such means for supporting and moving the energy beam source can provide for continuous and/or intermittent moving of the energy beam source. Also for example, the energy beam source can be stationary.

Examples of suitable means for exposing the object, comprising a material, to a controlled gas atmosphere, and for subjecting a specific area of the material to an energy beam include, but are not limited to, a moveable table, a moveable belt, a conveyor, and the like and combinations thereof.

Examples of suitable means for providing a controlled gas atmosphere include, but are not limited to, using a gas or gases that are pure, mixed, or pre-mixed such as using pure gases from cylinders, mixing together one or more pure gases from cylinders, using pre-mixed gases from cylinders, using pure gases from bulk containers, mixing together one or more pure gases from bulk containers, using pre-mixed gases from bulk containers, and the like and combinations thereof.

Examples of suitable means for providing a controlled gas atmosphere of the present invention comprises means for automatic or mechanical control of the controlled gas atmospheres comprising the use of various pump techniques as known in the art such as the use of, but not limited to, vacuum pumps, mechanical pumps, oil diffusion methods, cryogenic methods, turbo-molecular methods, and the like and combinations thereof.

Examples of suitable means for controlling the energy beam source include, but are not limited to, a computer, and the like, and combinations thereof.

Examples of suitable means for moving the energy beam, focused energy beam, filtered energy beam, and/or focused and filtered energy beam include, but are not limited to, reflective means such as mirrors, glass devices, quartz devices, lenses, and the like and combinations thereof and by refractive means such as prisms and the like. When means for moving the energy beam are utilized, such as the use of mirrors or prisms, the means for supporting and moving the energy beam source can be coordinated, such as by electrical communication, with the means for moving the energy beam, focused energy beam, filtered energy beam, and/or focused and filtered energy beam, to provide for a variety of treatments.

Examples of suitable means for controlling the object include, but are not limited to, a moveable table, a moveable belt, a conveyor, and the like, and combinations thereof.

Preferably, a means for exposing the object, comprising a material, to a controlled gas atmosphere, and for subjecting a specific area of the material to an energy beam, and the means for controlling the object can be combined. For example, a moving belt system, well known in related arts such as in the metallic sintering industry and in traditional wave soldering applications, can be used as both a means for exposing the object, comprising a material, to a controlled gas atmosphere, and for subjecting a specific area of the material to an energy beam, and as a means for controlling the object.

Also preferred, the means for controlling the energy beam source, the means for supporting and moving the energy beam source, and the optional means for moving the energy beam, focused energy beam, filtered energy beam, and/or focused and filtered energy beam, are in electronic communication with the means for exposing the object and the means for controlling the object. For example, when a computer is used as the means for controlling the energy beam source, such computer is adapted to control the energy beam source and energy beam provided by such source in reference to the material contained on or in the object. Further, the means for controlling the energy beam source and the means for supporting and moving the energy beam source may be one combined means.

In a preferred embodiment of the present invention, a laser beam(s) can be turned on or off by a computer to selectively treat specific areas of material on or in an object as the laser beam(s) scans the object to be treated. The means for supporting and moving the laser, and optional means for moving the laser beam, are also electronically coordinated with the computer to allow the laser beam(s) to move in coordination with the object (preferably placed upon a movable table, moving belt system, or the like) to provide for treating of the specific areas of the material contained on or in the object including areas located on the vertical and horizontal surfaces of the moving object including top and/or bottom surfaces. Provisions can be made to move the laser beam(s) up and down, as well as back and forth, by moving the laser beam source and/or moving the laser beam, such as by the use of mirrors, to allow selective treating of specific areas of material contained on the surfaces of the object that are in different planes. Such feature also allows the laser beam(s) to avoid other specific areas of material that are not to be treated. In a preferred embodiment of the present invention, a laser beam(s) can be turned on or off by a computer to selectively treat specific areas of material on or in an object as the laser beam(s) scans the object to be treated.

In a similar manner, if the energy beam source, such as a laser, is stationary, the means for moving the energy beam, focused energy beam, filtered energy beam, and/or focused and filtered energy beam can be electronically coordinated with the computer to allow the energy beam(s) to move in coordination with the object (preferably placed upon a movable table, moving belt system, or the like) to provide for treating of the specific areas of the material contained on or in the object including areas located on the vertical and horizontal surfaces of the moving object including top and/or bottom surfaces. Provisions can be made to move the laser beam(s) up and down, as well as back and forth, to allow selective treating of specific areas of material contained on the surfaces of the object that are in different planes. Such feature also allows the laser beam(s) to avoid other specific areas of material that are not to be treated.

More preferably, the means for exposing the object, comprising a material, to a controlled gas atmosphere, and for subjecting a specific area of the material to an energy beam, and the means for controlling the object, together comprise a moving belt system. Such moving belt system, in addition to the energy beam source, means for focusing the energy beam, means for filtering the energy beam, and optional means for moving the energy beam, focused energy beam, filtered energy beam, and/or focused and filtered energy beam, are all enclosed within a gas-tight enclosure to provide for treating, within a controlled gas atmosphere(s) as described herein, of a specific area(s) of material contained on or in the object(s). The moving belt system and gas-tight enclosure are well known in related arts such as in the metallic sintering industry and in traditional wave soldering applications.

Also preferred are apparatus of the present invention which result in direct welding of components and/or component leads to metallic surfaces within an enclosed controlled gas atmosphere comprising typical welding gas atmospheres. Another preferred apparatus of the present invention provides for direct welding of dissimilar materials within an enclosed controlled gas atmosphere.

The FIGURE discloses several example embodiments. It should be understood that many of the features and means disclosed in the FIGURE can be combined in any suitable manner and in any suitable order as long as the practice of the invention can be conducted.

Referring to the FIGURE, energy beam source 2 provides an energy beam 4 that passes through a means 6 for focusing energy beam 4 to provide a focused energy beam 8 that is used to treat a specific area 14 of a material 16 that is on or in object 18. The FIGURE discloses an example embodiment where focused energy beam 8 passes through a means 10 for filtering focused energy beam 8 to provide a focused and filtered energy beam 12 that is used to treat a specific area 14 of a material 16 that is on or in object 18. Means 10 and focused and filtered energy beam 12 are preferred, but are not required. Means 20 exposes specific area 14 to a reducing gas atmosphere 32 and subjects specific area 14 to focused and filtered energy beam 12. Object 18 is controlled by means 22. In an example embodiment, means 20 and means 22 can be one combined means. Energy beam source 2 is controlled by means 24 and is supported by and moved by means 26. In addition, in an example embodiment, means 20, means 22, means 24, and means 26 are in electrical communication 28. In another example embodiment, means 20 and 22 are one combined means in electrical communication 28 with means 24 and 26 that are one combined means. In another example embodiment, energy beam source 2 is stationary or moved intermittently, and energy beam 4, focused energy beam 8, and/or focused and filtered energy beam 12 can be moved by means 27. Also for example, means 20, means 22, means 24, means 26, and means 27 can be in electrical communication 28. Also for example, energy beam source 2, energy beam 4, means 6, focused energy beam 8, means 10, and focused and filtered energy beam 12 can be one combined means such as a self-contained laser assembly.

In another example embodiment, controlled gas atmosphere 32 is provided by means 30. In such example embodiment, controlled gas atmosphere 32 encompasses specific area 14 and focused and filtered energy beam 12.

In another example embodiment, controlled gas atmosphere 34 is provided by means 30. In such example embodiment, controlled gas atmosphere 34 encompasses material 16 containing specific area 14 and also encompasses focused and filtered energy beam 12.

In another example embodiment, controlled gas atmosphere 36 is provided by means 30. In such example embodiment, controlled gas atmosphere 36 encompasses object 18 comprising material 16 containing specific area 14 and also encompasses focused and filtered energy beam 12.

In another example embodiment, controlled gas atmosphere 38 is provided by means 30. Controlled gas atmosphere 38 encompasses object 18 comprising material 16 containing specific area 14 and also encompasses focused and filtered energy beam 12. Controlled gas atmosphere 38 also encompasses means 20 and means 22, separately or, for example, as one combined means.

In another example embodiment, controlled gas atmosphere 40 is provided by means 30 and encompasses the same object and means as controlled gas atmosphere 38 in addition to the means and apparatus providing the energy beam including energy beam source 2, energy beam 4, means 6 for focusing energy beam 4, focused energy beam 8, means 10 for filtering focused energy beam 8, and focused and filtered energy beam 12. Controlled gas atmosphere 40 also encompasses means 26 for supporting and moving energy beam source 2 and means 24 for controlling energy beam source 2. Controlled gas atmosphere 36 can also include the optional electrical communication 28 and optional means 27 for moving energy beam 4, focused energy beam 8, and/or focused and filtered energy beam 12.

Means 30 comprises manual or automatic control of the controlled gas atmospheres 32, 34, 36, 38, or 40, respectively.

Reasonable variations, modifications, and adaptations can be made within the scope of the disclosure and the appended claims without departing from the scope of the invention.

What is claimed is:

1. A method of treating an object, the method comprising:
   (a) exposing an object to a controlled gas atmosphere, said object comprising a material, said material being opaque or translucent;
   (b) during at least a portion of time during said exposing, subjecting one or more specific areas of said material to an energy beam having sufficient intensity to melt said one or more specific areas of said material; and
   (c) cooling said one or more specific areas of said melted material such that it solidifies and becomes transparent, wherein
      (i) said one or more specific areas is selected such that upon said solidification, paths of said transparent material are formed that can transmit light therealong, and
      (ii) portions of said material other than said one or specific areas are not melted.

2. An apparatus for treating specific areas of an object, said apparatus comprising:
   (a) means for practicing the process of claim 1, said means for practicing the process of claim 1 comprising
      (i) an energy beam,
      (ii) means for supporting and moving said energy beam source, and
      (iii) a means for exposing said object, comprising a material, to a controlled gas atmosphere, and for subjecting a specific area of said material to said energy beam.

3. A method of treating an object, the method comprising:
   (a) exposing an object to a controlled gas atmosphere, said object comprising a material selected from the group consisting of metal, oxidized metal, non-metal, and combinations thereof, and
   (b) during at least a portion of time during said exposing, subjecting a specific area of said material to an energy beam having sufficient intensity to provide a treating of said specific area.

4. The method in accordance with claim 3 wherein said treating is selected from the group consisting of heating, welding, cutting, dicing, soldering, singulating, reducing, oxidizing, fusing, melting, and combinations thereof.

5. The method in accordance with claim 3 wherein said material is metal.

6. The method in accordance with claim 3 wherein said energy beam is provided by an energy beam source comprising a laser selected from the group consisting of YAG lasers, excimer lasers, gas lasers, semiconductor lasers, solid-state lasers, dye lasers, X-ray lasers, free-electron lasers, ion lasers, gas mixture lasers, chemical lasers, and combinations thereof.

7. The method in accordance with claim 3 wherein said energy beam is provided by an energy beam source comprising an electron beam generator.

8. The method in accordance with claim 3 wherein said energy beam comprises a focused energy beam.

9. The method in accordance with claim 3 wherein said energy beam comprises a focused and filtered energy beam.

10. The method in accordance with claim 3 further comprising exposing said object to a second controlled gas atmosphere and subjecting to a second energy beam.

11. The method in accordance with claim 3 wherein said material is oxidized metal and said subjecting provides for a reducing of said oxidized metal.

12. The method in accordance with claim 3 wherein said object comprises a circuit board and further wherein said material is metal.

13. The method in accordance with claim 3 wherein said treating comprises heating and further wherein said method further comprises contacting said material with one or more second materials.

14. The method in accordance with claim 13 wherein said contacting is selected from the group consisting of welding, soldering, fusing, melting, joining, bonding and combinations thereof.

15. The method in accordance with claim 13 wherein said material is dissimilar from said one or more second materials.

16. The method in accordance with claim 13 wherein said contacting comprises welding and said controlled gas atmosphere comprises a welding gas atmosphere.

17. The method in accordance with claim 13 wherein said material comprises a non-metal and said one or more second materials comprise a non-metal.

18. The method in accordance with claim 13 wherein said object comprises a circuit board, said material comprises a metal on a surface of said circuit board, and said one or more second materials comprise a non-metallic conducting element.

19. The method in accordance with claim 13 wherein said contacting comprises welding, soldering, fusing, melting, joining, bonding, and combinations thereof, said object comprises a circuit board, said material comprises a non-metal on a surface of said circuit board, and said one or more second materials comprise a non-metallic conducting element.

20. The method in accordance with claim 13 wherein said contacting comprises soldering, said object comprises a circuit board, said material comprises a metal on a surface of said circuit board, and said one or more second materials comprise a non-metallic conducting element and a non-metallic conductor paste.

21. The method in accordance with claim 13 wherein said material and said one or more second materials comprise optic components.

22. The method in accordance with claim 3 wherein said treating comprises heating, said object comprises a circuit board, and said material comprises a non-metal selected from the group consisting of opaque materials, translucent materials, and combinations thereof.

23. The method in accordance with claim 22 wherein said method further comprises, after said subjecting, cooling said material thereby providing treated areas that will transmit light.

24. The method in accordance with claim 3 wherein said exposing is conducted under an exposing condition comprising a temperature, pressure, and time period.

25. The method in accordance with claim 24 wherein said exposing condition comprises:
a temperature of at least about 20° C.,
a temperature of no more than about 4000° C.,
a pressure of at least about vacuum,
a pressure of no more than about 3000 psia,
a time period of at least about 0.0001 second, and
a time period of no more than about 20 hours.

26. The method in accordance with claim 3 wherein said object comprises a silicon-based wafer.

27. The method in accordance with claim 26 wherein said material comprises an integrated circuit.

28. An apparatus for treating specific areas of an object, said apparatus comprising an energy beam source that provides an energy beam, means for supporting and moving said energy beam source, and a means for exposing said object, comprising a material, to a controlled gas atmosphere, and for subjecting a specific area of said material to said energy beam.

29. The apparatus of claim 28 further comprising a means for focusing said energy beam and a means for filtering said energy beam.

30. The apparatus of claim 28 further comprising a means for controlling said energy beam source and a means for controlling said object.

31. The apparatus of claim 28 wherein said energy beam is provided by an energy beam source comprising a laser selected from the group consisting of YAG lasers, excimer lasers, gas lasers, semiconductor lasers, solid-state lasers, dye lasers, X-ray lasers, free-electron lasers, ion lasers, gas mixture lasers, chemical lasers, and combinations thereof.

32. The apparatus of claim 29 wherein said means for focusing said energy beam are selected from the group consisting of glass lenses, quartz lenses, optical focusing devices, magnetic field lenses, electric field lenses, electron beam focusing devices, and combinations thereof.

33. The apparatus of claim 29 wherein said means for filtering said energy beam are selected from the group consisting optical filters, electromagnetic filters, and combinations thereof.

34. The apparatus of claim 28 wherein said means for supporting and moving said energy beam source are selected from the group consisting of conventional metallic mechanical structures, non-conventional metallic mechanical structures, conventional non-metallic mechanical structures, non-conventional non-metallic mechanical structures, and combinations thereof.

35. The apparatus of claim 28 wherein said means for exposing said object are selected from the group consisting of a moveable table, a moveable belt, a conveyor, and combinations thereof.

36. The apparatus of claim 30 wherein said means for controlling said energy beam source comprises a computer, said computer adapted to control movement of said energy beam in reference to said material.

37. The apparatus of claim 30 wherein said means for controlling said object comprises a moveable table.

38. The apparatus of claim 37 wherein said moveable table comprises a conveyor.

39. The apparatus of claim 28 further comprising a means for moving said energy beam.

40. The apparatus of claim 39 wherein said means for moving said energy beam comprises reflective means, refractive means, and combinations thereof.

41. The apparatus of claim 39 wherein said means for moving said energy beam is selected from the group consisting of mirrors, glass devices, quartz devices, lenses, prisms, and combinations thereof.

42. The apparatus of claim 39 wherein said energy beam source is stationary.

43. The apparatus of claim 39 wherein said energy beam source moves intermittently.

44. The method in accordance with claim 3 wherein said controlled gas atmosphere is selected from the group consisting of neutral gas atmospheres, oxidizing gas atmospheres, reducing gas atmospheres, carburizing gas atmospheres, and combinations thereof.

45. The method in accordance with claim 44 wherein said gas is selected from the group consisting of hydrogen, ammonia, carbon monoxide, methane, and combinations thereof.

* * * * *

UNITED STATES PATENT AND TRADEMARK OFFICE
CERTIFICATE OF CORRECTION

PATENT NO. : 6,670,570 B2 Page 1 of 1
DATED : December 30, 2003
INVENTOR(S) : Frederick W. Giacobbe, Joseph E. Paganessi and Yves Bourhis It is certified that error appears in the above-identified patent and that said Letters Patent is hereby corrected as shown below:

Column 7,
Line 49, please replace the term "GaInP" with the term -- GaInP --.

Column 14,
Line 51, please insert the word -- of -- between the words "consisting" and "optical".

Signed and Sealed this

Twenty-ninth Day of June, 2004

JON W. DUDAS
*Acting Director of the United States Patent and Trademark Office*